(12) United States Patent
Tai et al.

(10) Patent No.: US 8,934,591 B2
(45) Date of Patent: Jan. 13, 2015

(54) CLOCK AND DATA RECOVERY CIRCUIT AND PARALLEL OUTPUT CIRCUIT

(71) Applicants: Lianliang Tai, Anhui (CN); Guangren Li, Anhui (CN); Feng Chen, Anhui (CN)

(72) Inventors: Lianliang Tai, Anhui (CN); Guangren Li, Anhui (CN); Feng Chen, Anhui (CN)

(73) Assignee: Lontium Semiconductor Corporation (CN)

( * ) Notice: Subject to any disclaimer, the term of this patent is extended or adjusted under 35 U.S.C. 154(b) by 67 days.

(21) Appl. No.: 13/727,849

(22) Filed: Dec. 27, 2012

(65) Prior Publication Data

US 2013/0163706 A1 Jun. 27, 2013

(30) Foreign Application Priority Data

Dec. 27, 2011 (CN) .......................... 2011 1 0444863
Nov. 30, 2012 (CN) .......................... 2012 1 0504519

(51) Int. Cl.
*H04L 7/00* (2006.01)
*H04L 7/033* (2006.01)

(52) U.S. Cl.
CPC ............ *H04L 7/0012* (2013.01); *H04L 7/0338* (2013.01)
USPC .......................................... 375/354; 375/355

(58) Field of Classification Search
USPC ........................................................ 375/355
See application file for complete search history.

(56) References Cited

U.S. PATENT DOCUMENTS

| 8,416,902 | B2* | 4/2013 | Kyles et al. | 375/355 |
|---|---|---|---|---|
| 8,509,371 | B2* | 8/2013 | Kenney | 375/376 |
| 2004/0119518 | A1* | 6/2004 | Jaussi et al. | 327/202 |
| 2006/0140318 | A1* | 6/2006 | Farjad-rad | 375/355 |
| 2011/0066740 | A1* | 3/2011 | Campagna | 709/230 |
| 2012/0154059 | A1* | 6/2012 | Van der Wel et al. | 331/34 |

* cited by examiner

*Primary Examiner* — Santiago Garcia
(74) *Attorney, Agent, or Firm* — Cantor Colburn LLP

(57) ABSTRACT

The present invention provides a clock and data recovery circuit, including an n-phase clock, a sampling and edge detection unit, an edge determination unit, a clock picking unit and a data picking unit. The sampling and edge detection unit performs spaced sampling on the input serial data using the n-phase clock, and performs edge detection and resampling on the sampled data. The edge determination unit filters the resampled data by the counting units, and obtains the positions of the edges of the serial data according to the counting result of the counting units. The clock picking unit selects a clock from the n clocks that is the farthest away from the edges as the recovered clock. The data picking unit obtains the recovered data according to the recovered clock. The present invention also provides a parallel output circuit.

20 Claims, 6 Drawing Sheets

CLOCK AND DATA RECOVERY CIRCUIT AND PARALLEL OUTPUT CIRCUIT

This application claims the benefit of Chinese patent application No. 201210504519.4 titled "CLOCK AND DATA RECOVERY CIRCUIT AND PARALLEL OUTPUT CIRCUIT" and filed with the State Intellectual Property Office on Nov. 30, 2012, and claims the benefit of Chinese patent application No. 201110444863.4 titled "SERIAL CLOCK AND DATA RECOVERY CIRCUIT FOR USB 2.0 HI-SPEED" and filed with the State Intellectual Property Office on Dec. 27, 2011, both of which are incorporated herein by reference in their entireties.

FIELD OF THE INVENTION

The present invention relates to the field of data communications, and in particular to a clock and data recovery circuit and a parallel output circuit.

BACKGROUND OF THE INVENTION

In serial data transmission, a receiver/transmitter circuit is used for conversion between internal parallel data and external serial data. Specifically, based on the sampling theorem, the transmitter takes the parallel data, realizing parallel-to-serial conversion, sends individual bits through a transmission medium. Since there is no shared clock signal between the transmitter and the receiver for data synchronization, the receiver has to recover a clock signal from the received serial data stream. And the Clock and Data Recovery (CDR) circuit is responsible for extracting and recovering clock and data from the serial data. A post-stage serial-to-parallel circuit converts the recovered data into parallel data, and can realize byte synchronization by determining a characteristic pattern of the input serial data.

Currently, there are two basic types of CDR circuits. One is based on phase-locked loop (PLL). A PLL-based CDR circuit aligns the clock edge on the receiving side with the data edge detected from the serial data by a feedback loop, extracts a clock according to the detected data edge, and recovers data by sampling the data using the extracted clock. This type of CDR circuits must guarantee the stability of the closed-loop behavior, thus resulting in high complexity; moreover, the closed-loop structure is not suitable for high-speed situations. The other is burst mode CDR. Generally, a burst mode CDR circuit extracts and recovers a clock from the serial data by using a gated voltage-controlled oscillator at the edges of the serial data. The burst mode CDR circuit has an open-loop structure, and thus is simpler and more suitable for high-speed situations as compared with the PLL-based one. However, the burst mode CDR circuit extracts a clock at each occurrence of the edge of the serial data; hence, its performance is heavily dependent on the serial data. When the jitter of the serial data is high, the jitter of the recovered clock will be high; and in some cases, this may cause faults in the recovered clock, and bit errors.

SUMMARY OF THE INVENTION

A technical problem to be solved by the present invention is to provide a CDR circuit and a parallel output circuit, in order to produce a recovered clock that is less dependent on the jitter of the serial data.

Therefore, the present invention provides the following technical solutions.

In accordance with an embodiment of the present invention, it is provided a CDR circuit including: an n-phase clock, a sampling and edge detection unit, an edge determination unit, a clock picking unit and a data picking unit, wherein, the rate ratio of input serial data to any of the clock signals provided by the n-phase clock is m; n/m is a natural number greater than 2, m is a natural number greater than zero;

the sampling and edge detection unit includes: a first sampling group, an edge detection group and a second sampling group; the first sampling group includes n samplers, and the n samplers in the first sampling group sample the input serial data using the n clocks provided by the n-phase clock respectively, wherein the clock used by an i-th sampler in the first sampling group is an i-th clock provided by the n-phase clock where $0 \leq i < n$; the edge detection group includes n edge detectors, and the n edge detectors are adapted to detect an edge between adjacent sampling points sampled by the first sampling group, wherein a j-th edge detector in the edge detection group is adapted to detect an edge between adjacent sampling points sampled by j-th and (j+1)-th samplers in the first sampling group where $0 \leq j < n-1$, and wherein an (n-1)-th edge detector in the edge detection group is adapted to detect an edge between adjacent sampling points sampled by (n-1)-th and 0-th samplers in the first sampling group; the second sampling group includes n samplers, and the n samplers in the second sampling group are adapted to sample the edge information detected by the n edge detectors respectively, wherein an i-th sampler in the second sampling group is adapted to sample the edge information detected by an i-th edge detector where $0 \leq i < n$;

the edge determination unit includes n/m counting units, wherein a k-th counting unit is adapted to count the sum of the sampled edge information from m samplers in the second sampling group whose numbers can be marked as $k+n/m \times t$ where t is a natural number ranging from 0 to m−1; when a counting value of an s-th counting unit of the n/m counting units reaches a predetermined modulus, the s-th counting unit disables or resets all the other counting units of the n/m counting units, and outputs a valid signal to the clock picking unit, where $0 \leq k < n/m$, $0 \leq s < n/m$;

sampling clocks for the first sampling group, sampling clocks for the second sampling group and counting clocks for each of the counting units are provided by the n-phase clock;

the clock picking unit is adapted to select, upon receiving the valid signal output from the s-th counting unit, m clocks from the n clocks provided by the n-phase clock, each of which has the largest phase difference with one of m corresponding clock groups, and to determine the logical sum of the m clocks having the largest phase differences to be a recovered clock, wherein a t-th corresponding clock group of the m corresponding clock groups includes two clocks, numbered (s+n/m×t) and (s+n/m×t+1);

the data picking unit is adapted to sample the input serial data using the recovered clock obtained by the clock picking unit, the sampled data being recovered data of the CDR circuit.

Preferably, selecting a clock having the largest phase difference with q-th and (q+1)-th clocks from the n clocks provided the n-phase clock includes:

when n/m is odd, selecting a clock whose number is the remainder of $[q+(n/m+1)/2]/n$;

when n/m is even, selecting a clock whose number is the remainder of $[q+(n/m)/2]/n$ or the sum of the remainder plus 1.

Preferably, an i-th sampler in the second sampling group is adapted to sample the edge information detected by an i-th edge detector; the clock used by the i-th sampler in the second sampling group is an il-th clock provided by the n-phase clock, and the phase difference between the il-th and i-th clocks is determined by the sum of sampling time of an i-th sampler in the first sampling group and time delay of an i-th edge detector, where $0 \leq il < n$.

Preferably, a k-th counting unit uses m clocks provided by the n-phase clock whose numbers can be marked as $k+n/m \times t$, or m clocks provided by the n-phase clock whose numbers can be marked as $k+n/m \times t+1$.

Preferably, the s-th counting unit is further adapted to protect itself from being reset or disabled while disabling or resetting all the other counting units of the n/m counting units.

Preferably, resetting terminals of the counting units are active-low, and the edge determination unit further includes n/m AND gates, wherein each of the counting units corresponds to one of the AND gates; each of the counting units is connected to input terminals of all the AND gates except for the one corresponding to the counting unit itself; and an output terminal of each of the AND gates is connected to a resetting terminal of the corresponding counting unit;

when a counting value of an s-th counting unit of the n/m counting units reaches a predetermined modulus, the s-th counting unit outputs a low-level resetting signal to the input terminals of all the AND gates except for the one corresponding to the s-th counting unit.

Preferably, the edge determination unit further includes n/m OR gates, wherein each of the OR gates corresponds to one of the AND gates; an output terminal of each of the AND gates is connected to a resetting terminal of a counting unit corresponding to the AND gate via a OR gate corresponding to the AND gate;

when a counting value of an s-th counting unit of the n/m counting units reaches a predetermined modulus, the s-th counting unit outputs a high-level protecting signal to an input terminal of the OR gate corresponding to the AND gate that corresponds to the s-th counting unit.

Preferably, the clock picking unit includes n AND gates and one OR gate, wherein input terminals of the n AND gates are connected to the n clocks provided by the n-phase clock in a one-to-one manner, and a u-th AND gate of the n AND gates is connected to a u-th clock where $0 \leq u < n$;

the u-th AND gate of the n AND gates is connected to a counting unit whose number is the remainder of u/(n/m); output terminals of the n AND gates are connected to input terminals of the OR gate; and a clock output through an output terminal of the OR gate is the recovered clock.

Preferably, the clock picking unit further includes two inverters, wherein the two inverters are connected in series with the output terminal of the OR gate.

Preferably, m=1, the edge determination unit includes n counting units, wherein a k-th counting unit is adapted to count the sampled edge information from a k-th sampler in the second sampling group, using a k-th or (k+1)-th clock provided by the n-phase clock; when a counting value of an s-th counting unit of the n counting units reaches a predetermined modulus, the s-th counting unit disables or resets all the other counting units of the n counting units, and outputs a valid signal to the clock picking unit, where $0 \leq k < n$, $0 \leq s < n$;

the clock picking unit is adapted to, upon receiving a valid signal output from the s-th counting unit, determine a clock of the n clocks provided by the n-phase clock that has the largest phase difference with s-th and (s+1)-th clocks to be the recovered clock.

Preferably, the edge detector is an XOR gate or an XNOR gate.

Preferably, the counting unit is a counter or a shifter.

Preferably, the circuit further includes a path matching unit, wherein input data of the path matching unit are the serial input data; time delay of the path matching unit is the same as the clock picking unit;

the data picking unit sampling the input serial data using the recovery clock obtained by the clock picking unit includes: the data picking unit sampling output data from the path matching unit using the recovery clock obtained by the clock picking unit.

Preferably, the circuit further includes a buffer, wherein input data of the buffer are sampled data from the first sampling group; the buffer is adapted to delay or filter the input data of the buffer;

the data picking unit is further adapted to synchronize data output from the buffer with the recovered clock obtained by the clock picking unit;

the data picking unit sampling the input serial data using the recovery clock obtained by the clock picking unit includes: the data picking unit sampling the synchronized data using the recovered clock obtained by the clock picking unit.

The present invention also provides a parallel output circuit, including: a clock and data recovery circuit provided by the present invention and a serial-to-parallel circuit, wherein input serial data are input to the clock and data recovery circuit, and the serial-to-parallel circuit is adapted to convert recovered data output from the data picking unit of the CDR circuit into parallel data and output.

As can be seen from the above technical solution, the CDR circuit according to the embodiments of the present invention performs spaced sampling on the input serial data using the n clocks provided by the n-phase clock, performs edge detection and resampling on the sampled data, filters the resampled data by the counting units, obtains the positions of the edges of the serial data according to the counting result of the counting units, selects a clock from the n clocks that is the farthest away from the edges as the recovered clock, and then obtains the recovered data according to the recovered clock. It can be seen that, according to the embodiments of the present invention, the recovered clock is obtained using the n-phase clock, without extracting a clock at each occurrence of the edge of the serial data. Therefore, the CDR circuit according to the embodiments is less dependent on the serial data, and the jitter of the recovered clock is low even when the jitter of the serial data is high.

DETAILED DESCRIPTION OF THE EMBODIMENTS

A CDR circuit is responsible for extracting and recovering clock and data from the serial data. A principle of extracting and recovering the clock is to select a clock such that the phase difference between the edge of clock and the edge of the serial data is the largest.

An n-phase clock is a multi-phase clock for providing n clocks with equal phase intervals. The frequencies of the n clocks provided by the n-phase clock are the same. In this specification, in the interest of clarity, the n clocks provided by the n-phase clock are numbered from zero to n−1 sequentially according to their phases where the phase difference between adjacent clocks is 360/n degrees.

First Embodiment

Figure 1:
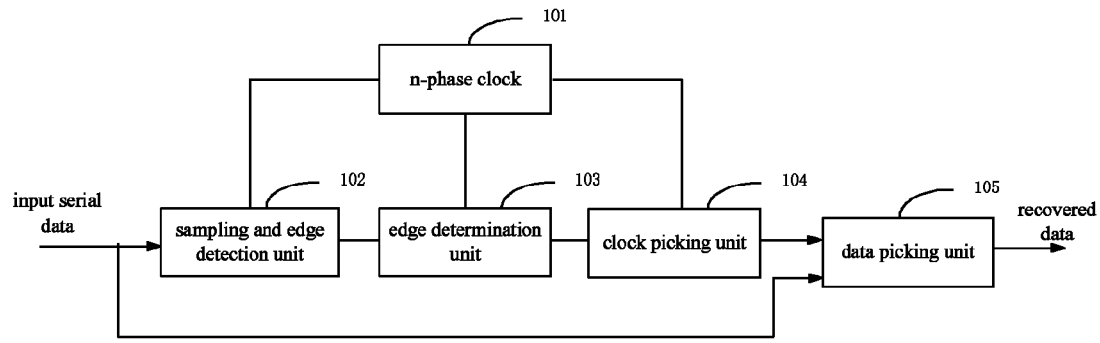
FIG. 1 is a structural diagram illustrating a CDR circuit in accordance with an embodiment of the present invention.

As shown in FIG. 1, an embodiment of the present invention provides a CDR circuit. In the embodiment, the circuit includes: an n-phase clock 101, a sampling and edge detection unit 102, an edge determination unit 103, a clock picking unit 104 and a data picking unit 105. Specifically, the rate ratio of input serial data to any of the clock signals provided by the n-phase clock is m. When m=1, the rates of the input serial data and the n-phase clock are the same, and the n-phase clock operates in a full-rate mode. Generally, the n-phase clock may also operate in a 1/m rate mode, e.g., ½, ⅓ or ¼; hence m is a natural number greater than zero. In the embodiment, the n-phase clock is used for spaced sampling of the input serial data, with n/m being a sampling accuracy. In order to satisfy the sampling theorem, n/m must be a natural number greater than 2, and it is clear that n is an integer multiple of m.

Figure 2:
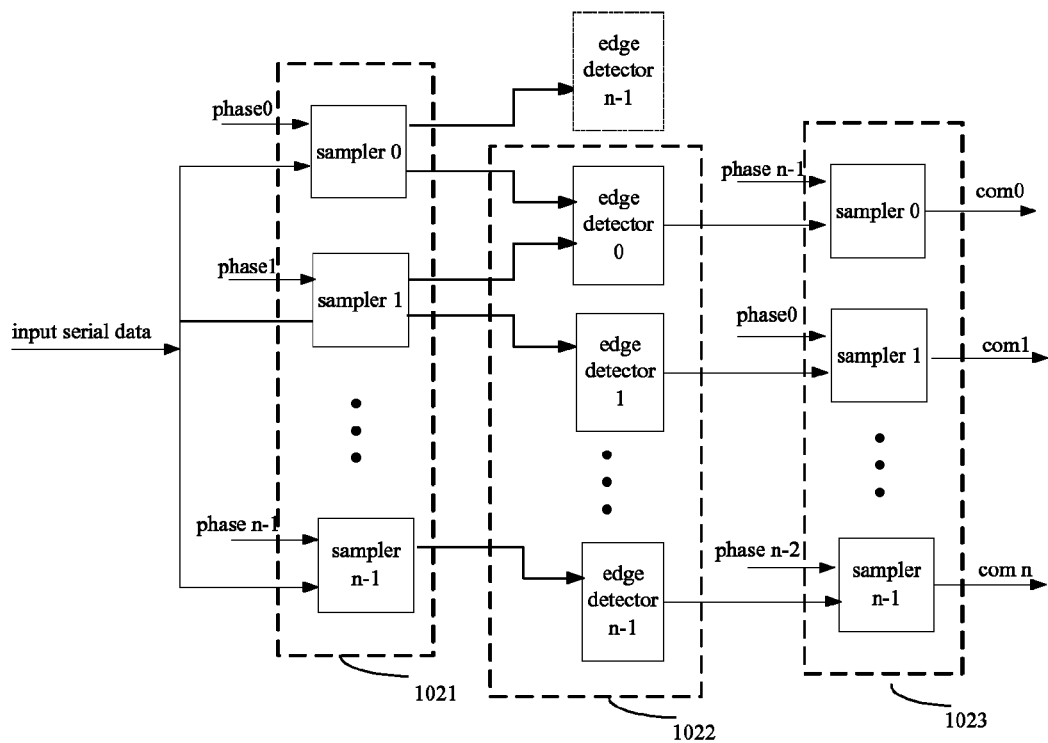
FIG. 2 is a structural diagram illustrating a sampling and edge detection unit in the embodiment shown in FIG. 1.

As shown in FIG. 2, the sampling and edge detection unit 102 in the embodiment includes: a first sampling group 1021, an edge detection group 1022 and a second sampling group 1023. The first sampling group 1021 includes n samplers; and the n samplers in the first sampling group sample the input serial data using the n clocks provided by the n-phase clock respectively. In other words, the sampling clocks for the first sampling group are provided by the n-phase clock. Specifically, the clock used by an i-th sampler in the first sampling group is an i-th clock provided by the n-phase clock, where 0≤i<n, i is not a fixed value but can be any of the natural numbers in the interval [0, n). In FIG. 2, "sampler i" represents an i-th sampler in the first sampling group, and "phase i" represents an i-th clock. The samplers in the first sampling group 1021 are devices having a sampling function, and specifically may be D flip-flops.

The edge detection group 1022 includes n edge detectors; and the n edge detectors are used to detect an edge between adjacent sampling points sampled by the first sampling group 1021. Specifically, a j-th edge detector in the edge detection group 1022 is used to detect an edge between adjacent sampling points sampled by j-th and (j+1)-th samplers in the first sampling group 1021, where 0≤j<n−1, j is not a fixed value but can be any of the natural numbers in the interval [0, n). An (n−1)-th edge detector in the edge detection group 1022 is used to detect an edge between adjacent sampling points sampled by (n−1)-th and 0-th samplers in the first sampling group 1021. In FIG. 2, "edge detector j" represents a j-th edge detector. The edge detectors are devices capable of detecting edges, and specifically may be XOR gates or XNOR gates. For a better illustration that an n-th edge detector detects an edge between adjacent sampling points sampled by n-th and 0-th samplers in the first sampling group 1021, FIG. 2 shows two edge detectors n−1. However, the edge detection group 1022 clearly includes only one edge detector n−1.

The second sampling group 1023 includes n samplers; and the n samplers in the second sampling group sample the edge information detected by the n edge detectors respectively. Specifically, an i-th sampler in the second sampling group is used to sample the edge information detected by an i-th edge detector. The clocks used by the samplers in the second sampling group, i.e., the sampling clocks for the second sampling group, are provided by the n-phase clock. Specifically, the clock used by an i-th sampler in the second sampling group is an i1-th clock provided by the n-phase clock, and the phase difference between the i1-th and i-th clocks is determined by the sum of the sampling time of an i-th sampler in the first sampling group and time delay of an i-th edge detector, where 0≤i1<n, it is not a fixed value but can be any of the natural numbers in the interval [0, n). FIG. 2 shows a 1-st sampler in the second sampling group 1022 uses an (n−1)-th clock provided by the n-phase clock. However, in a practical application, some other clock, e.g., an (n−2)-th or (n−3)-th clock, may be used. In FIG. 2, "sampler i" represents an i-th sampler in the second sampling group; and "com i" represents sampled edge information output by an i-th sampler in the second sampling group 1023. The samplers in the second sampling group 1023 are devices having a sampling function, and specifically may be D flip-flops.

The edge determination unit 1024 includes n/m counting units. Specifically, a k-th counting unit is used to count the sum of the sampled edge information from m samplers in the second sampling group whose numbers can be marked as k+n/m×t, where 0≤t<m, t is a natural number ranging from 0 to m−1. That is, starting from a 0-th sampler in the first sampling group 1021, sampled data from each every n/m samplers are to be input to the same counting unit. The accuracy of oversampling is determined by n/m, and the bit width in the processing is determined by m. Therefore, for each of the counting units, it counts the edge information collected using the same group of m clocks with the phase interval n/m. The period is the time for transmitting one bit of the serial data.

The counting clocks for the counting units are provided by the n-phase clock. Specifically, a k-th counting unit uses m clocks provided by the n-phase clock whose numbers can be marked as k+n/m×t. Specifically, a k-th counting unit may also use m clocks provided by the n-phase clock whose numbers can be marked as k+n/m×t+1, where 0≤t<m, i.e., t is a natural number ranging from 0 to m−1. The counting units are devices having a counting function such as counters and shifters.

When a counting value of an s-th counting unit of the n/m counting units reaches a predetermined modulus, the s-th counting unit disables or resets all the other counting units of the n/m counting units, and outputs a valid signal to the clock picking unit, where 0≤k<n/m, 0≤s<n/m, k and s are not fixed values but can be any of the natural numbers in the interval [0, n/m). For example, when a counting value of a 0-th counting unit reaches a predetermined modulus, the 0-th counting unit resets or disables all the other counting units, i.e., the counting units numbered from 1 to n/m−1. The s-th counting unit may maintain the other counting units in a disabled or reset state until receiving a resetting signal. It should be noted that, if two or more counting units reach a predetermined modulus at the same time, the two or more counting units may not reset or disable one another, but only reset or disable the rest of the counting units. The predetermined modulus may be set according to the jitter of the input serial data. If the jitter of the input serial data is high, the predetermined modulus may be set to have a greater value so that more information can be used for more accurate determination. In fact, the existence of the predetermined modulus affects the locking time of the CDR circuit and the bandwidth of data tracking. Therefore, the predetermined modulus should not be set too large, in which case the bandwidth of data tracking may become too low and frequency offset tracking may fail.

Upon receiving the valid signal output from an s-th counting unit, the clock picking unit 104 selects m clocks from the n clocks provided by the n-phase clock, each of which has the largest phase difference with one of m corresponding clock groups, and determines the logical sum of the m clocks having the largest phase differences to be a recovered clock. Specifically, a t-th corresponding clock group of the m corresponding clock groups includes two clocks, numbered (s+n/m×t) and (s+n/m×t+1). It should be noted that, the m clocks having the largest phase differences are the same as the group of m clocks with the phase interval n/m described above. The edges of the input data in the interval between the clocks numbered (s+n/m×t) and (s+n/m×t+1) are detected.

For example, when s=0, m=2, n=8 and hence s+n/m×t=4 t, then a 0-th corresponding clock group includes 0-th and 1-th clocks, and a 1-th corresponding clock group includes 4-th and 5-th clocks. Therefore, upon receiving a valid signal output from a 0-th counting unit, the clock picking unit 104 selects, from the n clocks provided by the n-phase clock, a clock having the largest phase difference with 0-th and 1-th clocks: a 2-th or 3-th clock, and a clock having the largest phase difference with 4-th and 5-th clocks: a 6-th or 7-th clock. It is noted that, 2-th and 6-th clocks belong to the same group, and 3-th and 7-th clocks belong to the same group. If the group including 2-th and 6-th clocks is selected, the logical sum of the clocks is to be used as the recovered clock. If 0-th and 1-th counters reach the predetermined modulus at the same time, both the above families, i.e., 2-th and 6-th clocks, and 3-th and 7-th clocks, are selected. In this case, 2-th and 3-th clocks are selected at the same time, and their logical sum is determined to be the recovered clock, which has a changed duty cycle as compared with the previous case. Selecting 6-th and 7-th clocks at the same time results the same change.

The data picking unit 105 is used to sample the input serial data using the recovered clock obtained by the clock picking unit 104. The sampled data are recovered data of the CDR circuit.

As can be seen from the above technical solution, the CDR circuit performs spaced sampling on the input serial data using the n clocks provided by the n-phase clock, performs edge detection and resampling on the sampled data, filters the resampled data by the counting units, obtains the positions of the edges of the serial data according to the counting result of the counting units, selects a clock from the n clocks that is the farthest away from the edges as the recovered clock, and then obtains the recovered data according to the recovered clock. It can be seen that, in the embodiment the recovered clock is obtained using the n-phase clock, without extracting a clock at each occurrence of the edge of the serial data. Therefore, the CDR circuit according to the embodiment is less dependent on the serial data, and the jitter of the recovered clock is low even when the jitter of the serial data is high.

In the embodiment, data-to-clock rate radio m is a natural number greater than 0, and n/m is a natural number greater than 2. The selecting a clock having the largest phase difference with q-th and (q+1)-th clocks from the n clocks provided the n-phase clock may include, where q and (q+1) clocks are two clocks where edges of the sampling data are detected:

when n/m is odd, selecting a clock whose number is the remainder of $[q+(n/m+1)/2]/n$;

when n/m is even, selecting a clock whose number is the remainder of $[q+(n/m)/2]/n$ or the sum of the remainder plus 1.

In the embodiment, the edge determination unit 103 includes n/m counting units. When a counting value of an s-th counting unit of the n/m counting units reaches a predetermined modulus, the s-th counting unit disables or resets all the other counting units of the n/m counting units, and outputs a valid signal to the clock picking unit. Specifically, each of the counting units in the edge determination unit 103 may be connected to resetting or enabling terminals of the other counting units via a logic gate, so that when a counting value of one of the counting units reaches a predetermined modulus, the logic gate outputs a resetting signal to the resetting terminals of the other counting units or outputs a disabling signal to the enabling terminals of the other counting units. The specific type of the logic gate may be determined according to the level of the signal output by the counting unit when it reaches the predetermined modulus, and the type of the resetting or enabling terminals, e.g., active-low or active-high. An example is given below.

Figure 3:
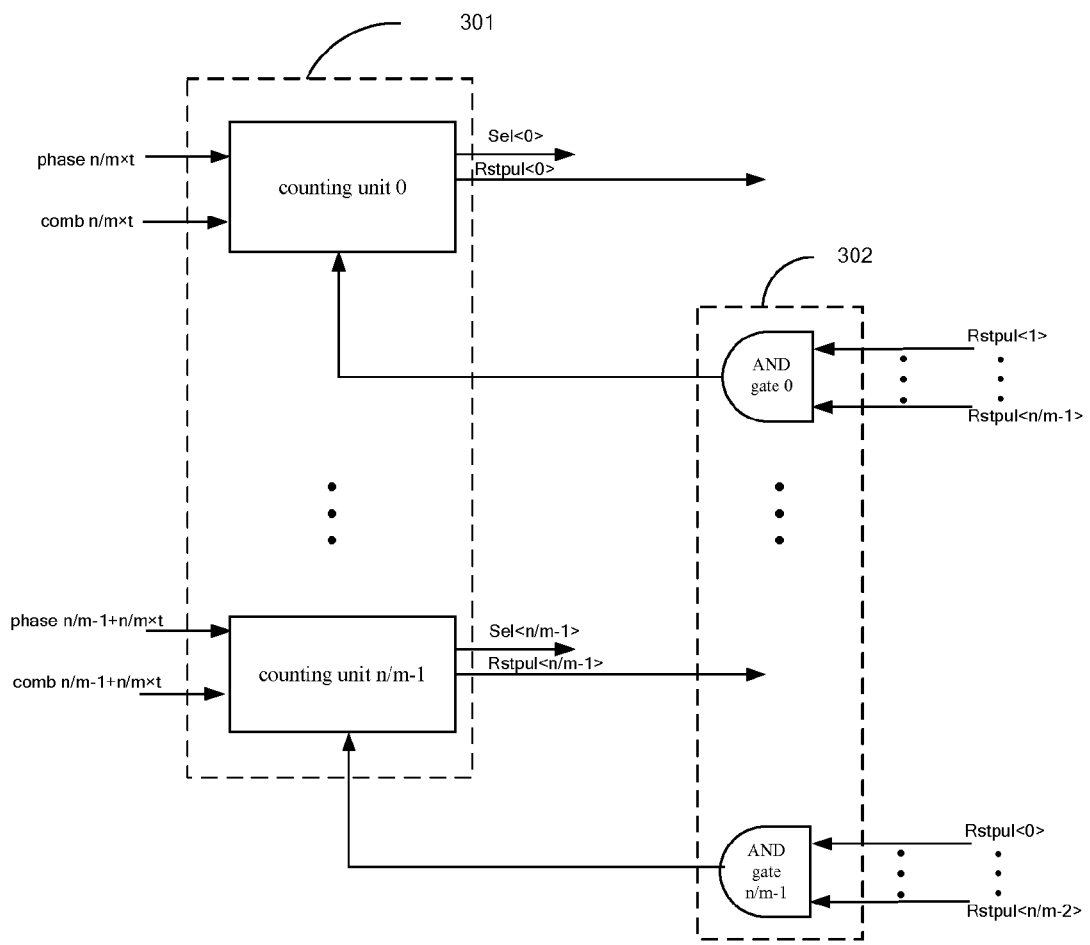
FIG. 3 is a structural diagram illustrating an edge determination unit in accordance with an embodiment of the present invention.

The edge determination unit shown in FIG. 3 includes n/m counting units 301 and n/m AND gates 302. A k-th counting unit is used to count the sum of the sampled edge information from m samplers in the second sampling group whose numbers can be marked as k+n/m×t, wherein 0≤t<m, i.e., t is a natural number ranging from 0 to m−1. The input data of the k-th counting unit is the sampled data from the m samplers in the second sampling group whose numbers can be marked as k+n/m×t.

Each of the counting units may be set with the same predetermined modulus. When an s-th counting unit reaches the predetermined modulus, it outputs a low-level resetting signal Rstpul<s> and a high-level valid signal Sel<s>. The resetting terminals of the counting units are active-low, where 0≤s<n/m.

As shown in FIG. 3, each of the counting units corresponds to an AND gate. Specifically, an s-th counting unit (represented by "counting unit s" in FIG. 3) corresponds to an s-th AND gate (represented by "AND gate s" in FIG. 3). Each of the counting units is connected to input terminals of all the AND gates except for the one corresponding to the counting unit itself; and an output terminal of each of the AND gates is connected to a resetting terminal of the corresponding counting unit. In other words, for an AND gate corresponding to a counting unit, the input terminals of the AND gate are connected to all the other counting units. For example, a 0-th counting unit is connected to the input terminals of all the AND gates except for the one corresponding to the 0-th. That is, the 0-th counting unit is connected to the input terminals of the AND gates numbered from 1 to n/m−1; and the output terminal of the 0-th AND gate is connected to the resetting terminal of the 0-th counting unit.

When the counting value of an s-th counting unit of the n/m counting units reaches a predetermined modulus, the s-th counting unit outputs a low-level resetting signal to the input terminals of all the AND gates except for the one corresponding to the s-th counting unit. Then, all the AND gates except for the one corresponding to the s-th counting unit output a low-level. Since the counting units are active-low, the s-th counting unit resets all the other counting units.

The counting clocks for the counting units are provided by the n-phase clock. Specifically, a k-th counting unit uses m clocks provided by the n-phase clock whose numbers can be marked as k+n/m×t. For example, a 0-th counting unit uses m clocks provided by the n-phase clock whose numbers can be marked as n/m×t, where 0≤t<m, i.e., t ranges from 0 to m.

If two or more counting units reach the predetermined modulus at the same time, the edge determination unit shown in FIG. 3 may result in a logic error. Therefore, in the embodiment, an s-th counting unit may protect itself from being reset or disabled while disabling or resetting all the other counting units of the n/m counting units. Specifically, the logic gate may be used so that the counting unit outputs a protecting signal to its resetting or enabling terminal while outputting a valid signal. An example is given below.

Figure 4:
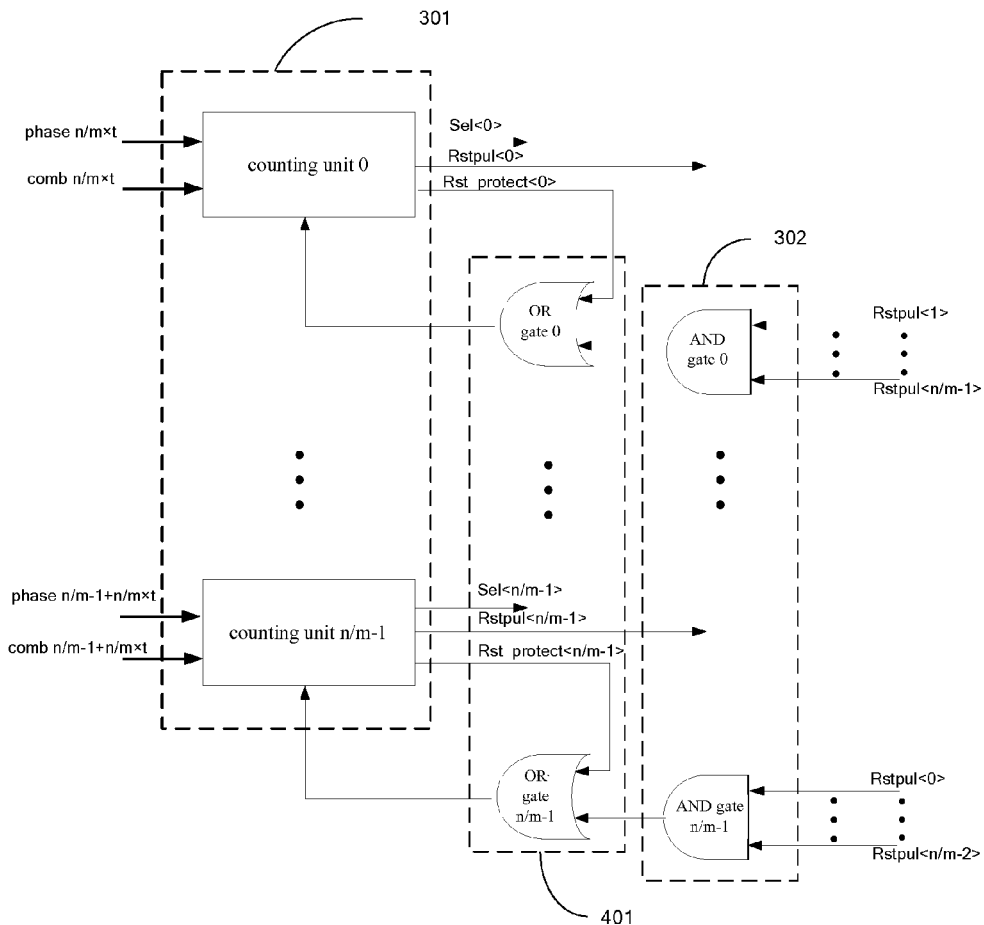
FIG. 4 is a structural diagram illustrating an edge determination unit in accordance with another embodiment of the present invention.

The edge determination unit shown in FIG. 4 includes n/m counting units 301, n/m AND gates 302 and n/m OR gates 401. Each of the counting units is set with the same predetermined modulus. When an s-th counting unit reaches the predetermined modulus, it outputs a low-level resetting signal Rstpul<s>, a high-level valid signal Sel<s> and a high-level protecting signal Rst_protect<s>. The resetting terminals of the counting units are active-low, where 0≤s<n/m.

As shown in FIG. 4, each of the counting units corresponds to an AND gate. Specifically, an s-th counting unit (represented by "counting unit s" in FIG. 4) corresponds to an s-th AND gate (represented by "AND gate s" in FIG. 4). Each of the counting units is connected to input terminals of all the AND gates except for the one corresponding to the counting unit itself; and an output terminal of each of the AND gates is connected to a resetting terminal of the corresponding counting unit via the corresponding OR gate. For example, a 0-th counting unit is connected to the input terminals of all the AND gates except for the one corresponding to the 0-th. That is, the 0-th counting unit is connected to the input terminals of the AND gates numbered from 1 to n/m−1; and the output terminal of the 0-th AND gate is connected to the resetting terminal of the 0-th counting unit via the 0-th OR gate.

When the counting value of an s-th counting unit of the n/m counting units reaches a predetermined modulus, the s-th counting unit outputs a low-level resetting signal to the input terminals of all the AND gates except for the one corresponding to the s-th counting unit, and outputs a high-level protecting signal to an input terminal of the OR gate corresponding to the AND gate that corresponds to the s-th counting unit. Then, all the AND gates except for the one corresponding to the s-th counting unit output a low-level, and the OR gate corresponding to the s-th counting unit outputs a high-level. Since the counting units are active-low, the s-th counting unit resets all the other counting units but does not reset itself In the embodiment, the clock picking unit selects, upon receiving a valid signal output from an s-th counting unit, m clocks from the n clocks provided by the n-phase clock, each of which has the largest phase difference with one of m corresponding clock groups, and determines the logical sum of the m clocks having the largest phase differences to be a recovered clock. Specifically, a t-th corresponding clock group of the m corresponding clock groups includes two clocks, numbered (s+n/m×t) and (s+n/m×t+1). The clock picking circuit may include a plurality of logic gates. An example is given below.

The clock picking unit may include n AND gates and one OR gate. The input terminals of the n AND gates in the clock picking circuit are connected to the n clocks provided by the n-phase clock in a one-to-one manner. m AND gates in the clock picking unit are connected to one counting unit; specifically, a u-th AND gate is connected to a counting unit whose number is the remainder of u/(n/m). The n AND gates receive a valid signal output from a counting unit via connecting terminals with the counting unit. Output terminals of the n AND gates are connected to input terminals of the OR gate; and a clock output through an output terminal of the OR gate is the recovered clock. It can be seen that, the CDR circuit determines the logical sum of the m clocks that have the largest phase differences to be the recovered clock using the n AND gates and the OR gate. The output terminal of the OR gate may further be connected in series with two inverters in order to enhance driving performance.

In the embodiment below, a CDR circuit where m=1, i.e., the n-phase clock is in a full-rate mode, is described as an example.

Second Embodiment

Figure 5:
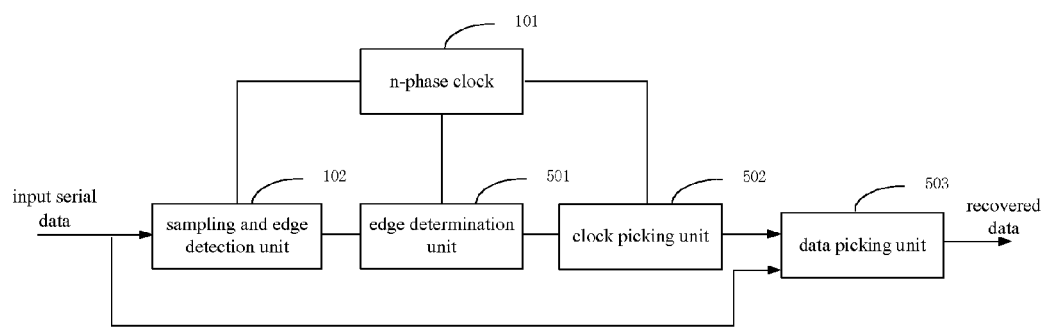
FIG. 5 is a structural diagram illustrating a CDR circuit in accordance with another embodiment of the present invention.

A CDR circuit in accordance with another embodiment of the present invention is illustrated in FIG. 5. In the embodiment, the circuit includes: an n-phase clock 101, a sampling and edge detection unit 102, an edge determination unit 501, a clock picking unit 502 and a data picking unit 503. Specifically, m=1, in other words, the rates of the input serial data and the n-phase clock are the same, i.e., the n-phase clock is in a full-rate mode.

The sampling and edge detection unit 102 may have the same structure and functions as those of the sampling and edge detection unit 102 in the first embodiment as shown in FIG. 2. Detailed description is thus omitted.

In the embodiment, the edge determination unit 501 includes n counting units. A k-th counting unit is used to count the sampled edge information from a k-th sampler in the second sampling group, using a k-th or (k+1)-th clock provided by the n-phase clock. When a counting value of an s-th counting unit of the n counting units reaches a predetermined modulus, the s-th counting unit disables or resets all the other counting units of the n counting units, and outputs a valid signal to the clock picking unit, and may protect the s-th counting unit itself from being reset or disabled. Specifically, 0≤k<n, 0≤s<n. For example, when the counting value of a 0-th counting unit reaches the predetermined modulus, e.g., 3, the 0-th counting unit resets or disables all the other counting units, i.e., the counting units numbered from 1 to (n−1). In this case, the s-th counting unit may maintain the other counting units in a disabled or reset state until receiving a resetting signal. It should be noted that, if two or more counting units reach a predetermined modulus at the same time, the two or more counting units may not reset or disable one another, but only reset or disable the rest of the counting units.

The clock picking unit 504 is used to, upon receiving a valid signal output from an s-th counting unit, determine a clock of the n clocks provided by the n-phase clock that has the largest phase difference with s-th and (s+1)-th clocks to be a recovered clock. For example, when s=0 and n=8, upon receiving a valid signal output from a 0-th counting unit, the clock picking unit 504 selects, from the n clocks provided by the n-phase clock, a clock having the largest phase difference with 0-th and 1-th clocks. In the case where n=8, the clock having the largest phase difference with the 0-th and 1-th clocks is a 4-th or 5-th clock; hence the clock picking circuit 504 determines the 4-th or 5-th clock as the recovered clock. It should be noted that the clock picking unit 504 may determine the logical sum of two clocks as the recovered clock if it receives valid signals output from two or more counting units. Specifically, the clock picking circuit may include a plurality of logic devices. An example is given below.

Figure 6:
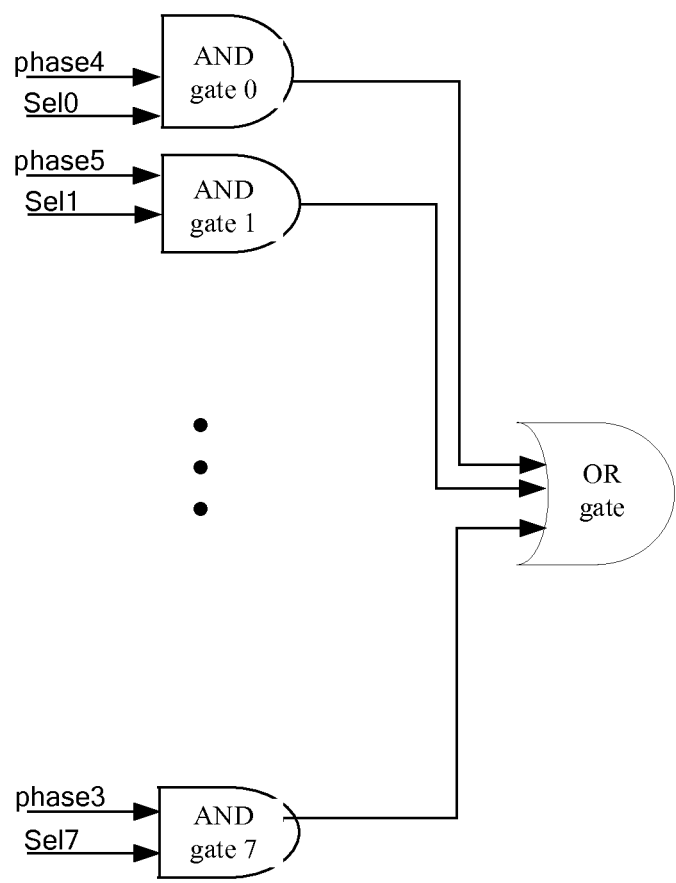
FIG. 6 is a structural diagram illustrating a clock picking circuit in accordance with an embodiment of the present invention.
Figure 7:
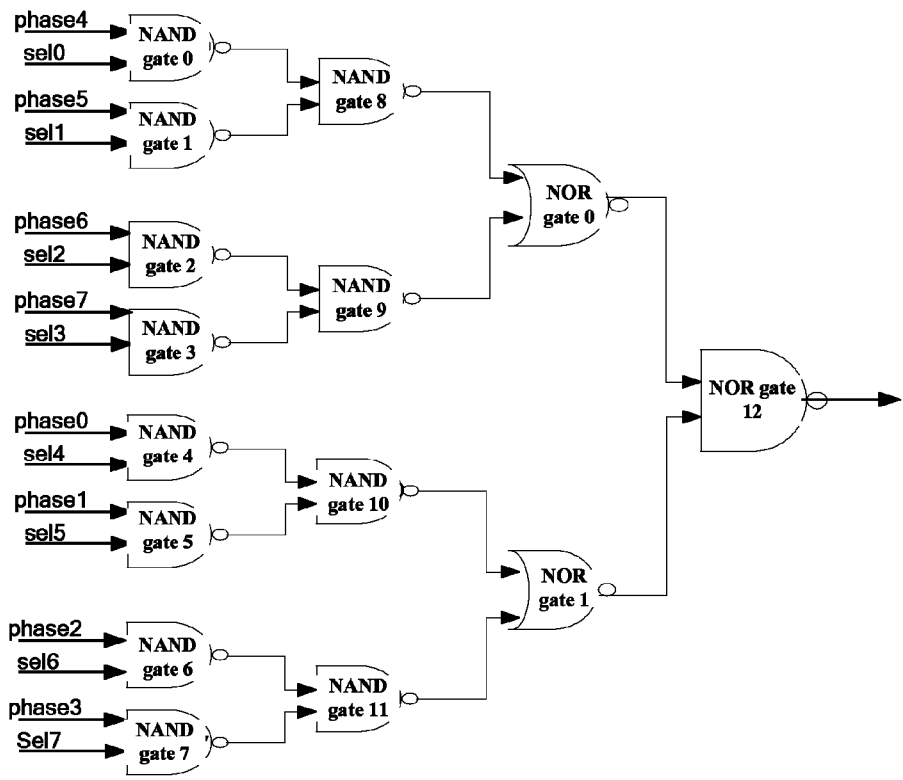
FIG. 7 is a structural diagram illustrating a clock picking circuit in accordance with another embodiment of the present invention.

In the embodiment, when n=8, the clock picking circuit 504 may has a structure shown in FIG. 6 or FIG. 7. The clock picking circuit 504 shown in FIG. 6 includes eight AND gates numbered from 0 to 7, and one OR gate. Two input terminals of a 0-th AND gate are for a 4-th clock provided by an eight-phase clock and a valid signal Sel0 output from a 0-th counting unit. Two input terminals of a 1-th AND gate are for a 5-th clock provided by the eight-phase clock and a valid signal Sel1 output from a 1-st counting unit. The rest of the AND gates are similar. Two input terminals of a 7-th AND gate are for a 3-th clock provided by the eight-phase clock and a valid signal Sel7 output from a 7-th counting unit. Output terminals of the eight AND gates are connected to input terminals of the OR gate, and an output terminal of the OR gate is for outputting the recovered clock. The clock picking circuit 504 shown in FIG. 7 includes thirteen NAND gates numbered from 1 to 12, and two NOR gates numbered 0 and 1. Its functions are similar to the clock picking circuit shown in FIG. 6. Specifically, two input terminals of a 0-th NAND gate are for a 4-th clock provided by the eight-phase clock and a valid signal Sel0 output from a 0-th counting unit. The rest are similar. Two input terminals of a 7-th NAND gate are for a 3-th clock provided by the eight-phase clock and a valid signal Sel7 output from a 7-th counting unit. Input terminals of an 8-th NAND gate are connected to output terminals of 0-th and 1-th NAND gates, input terminals of a 9-th NAND gate are connected to output terminals of 2-th and 3-th NAND gates, input terminals of a 10-th NAND gate are connected to output terminals of 4-th and 5-th NAND gates, and input terminals of an 11-th NAND gate are connected to output terminals of 6-th and 7-th NAND gates. Input terminals of a 0-th NOR gate are connected to output terminals of 8-th and 9-th NAND gates. Input terminals of a 1-th NOR gate are connected to output terminals of 10-th and 11-th NAND gates. Input terminals of a 12-th NAND gate are connected to output terminals of 0-th and 1-th NOR gates.

The data picking unit 503 is used to sample the input serial data using the recovered clock obtained by the clock picking unit 104. The sampled data are recovered data of the CDR circuit.

Third Embodiment

Figure 8:
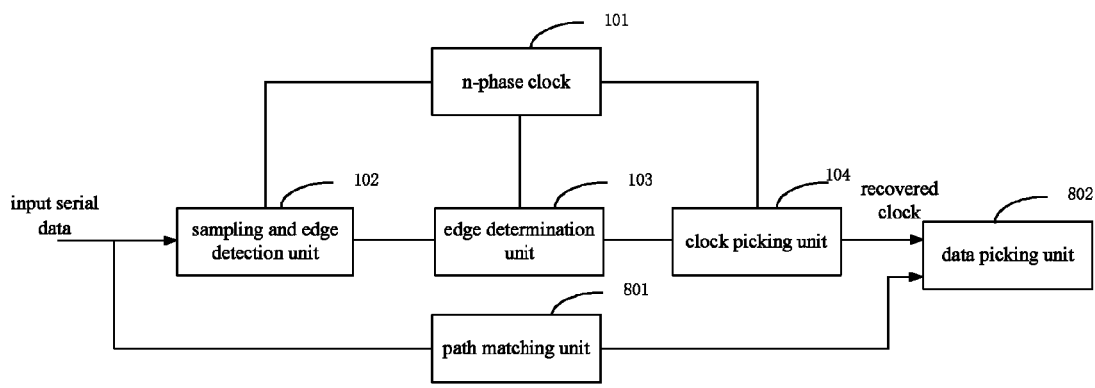
FIG. 8 is a structural diagram illustrating a path matching unit in accordance with an embodiment of the present invention.

A CDR circuit in accordance with yet another embodiment of the present invention is illustrated in FIG. 8. In the embodiment, the circuit includes: an n-phase clock 101, a sampling and edge detection unit 102, an edge determination unit 103, a clock picking unit 104, a path matching unit 801 and a data picking unit 802.

The n-phase clock 101, the sampling and edge detection unit 102, the edge determination unit 103 and the clock picking unit 104 may have the same structure and functions as those of the sampling and edge detection unit 102 in the first embodiment. Detailed description is thus omitted.

The input serial data are input to the path matching unit 801. The time delay of the path matching unit 801 must be the same as the clock picking unit 104. Specifically, the logic devices used in the path matching circuit may be consistent with those of the clock picking unit, thereby eliminating the need to adjust the time delay of the path matching circuit.

The data picking unit 802 is used to sample output data from the path matching unit using a recovered clock obtained by the clock picking unit 104. The sampled data are recovered data of the CDR circuit.

Figure 9:
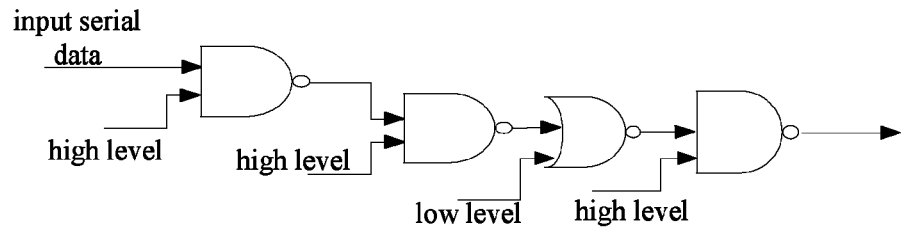
FIG. 9 is a structural diagram illustrating a CDR circuit in accordance with yet another embodiment of the present invention.

In the embodiment, when n=8, m=1 and the CDR circuit uses a clock picking circuit as shown in FIG. 7, the path matching circuit may has a structure as shown in FIG. 9 so that the logic devices in the path matching circuit are consistent with those in the CDR circuit shown in FIG. 7. The path matching circuit shown in FIG. 9 includes three NAND gates and one NOR gate. Each of the three NAND gates has an input terminal at a high level, and the NOR gate has an input terminal at a low level. In the case where a 12-th NAND gate of the clock picking circuit shown in FIG. 7 is further connected in series with two inverters downstream, the path matching unit in FIG. 9 is also connected in series with two inverters downstream.

Fourth Embodiment

Figure 10:
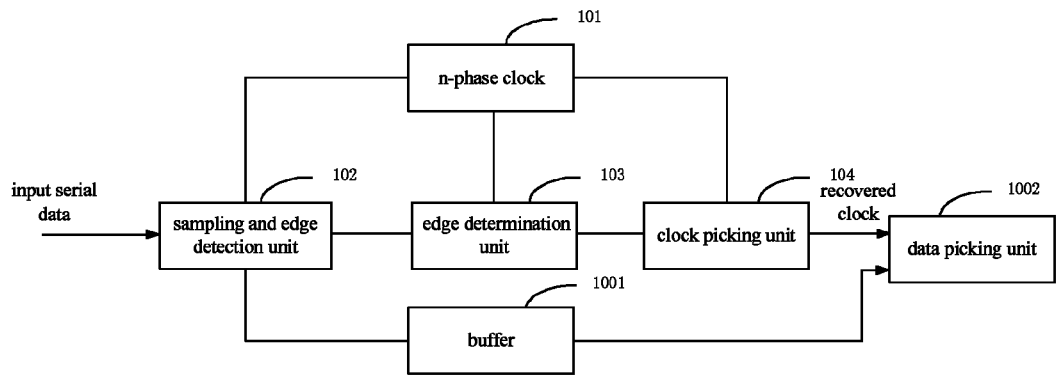
FIG. 10 is a structural diagram illustrating a CDR circuit in accordance with still another embodiment of the present invention.

A CDR circuit in accordance with still another embodiment of the present invention is illustrated in FIG. 10. In the embodiment, the circuit includes: an n-phase clock 101, a sampling and edge detection unit 102, an edge determination unit 103, a clock picking unit 104, a data picking unit 1002 and a buffer 1001.

The n-phase clock 101, the sampling and edge detection unit 102, the edge determination unit 103 and the clock picking unit 104 may have the same structure and functions as those of the sampling and edge detection unit 102 in the first embodiment. Detailed description is thus omitted.

Sampled data from the first sampling group are input to the buffer 1001. The buffer is used to delay or filter the input data of the buffer.

The data picking unit 1002 is used to synchronize data output from the buffer with a recovered clock obtained by the clock picking unit, and sample the synchronized data using the recovered clock obtained by the clock picking unit. The sampled data are recovered data of the CDR circuit.

Specifically, the data picking unit may synchronize the data output from the buffer with the recovered clock obtained by the clock picking unit by: selecting data output from the buffer according to the recovered clock so that the distance between the edge of the selected data and the edge of the recovered clock is the largest. This unit may be implemented with a selector having the same structure as the clock picking unit 104. Moreover, the selector may be connected to the edge determination unit in the same way as the clock picking unit is connected to the edge determination unit. As a result, via the selector having the same structure as the clock picking unit 104, the logical sum of the data output from the buffer is used as the sampling data for the data picking unit.

Fifth Embodiment

Figure 11:
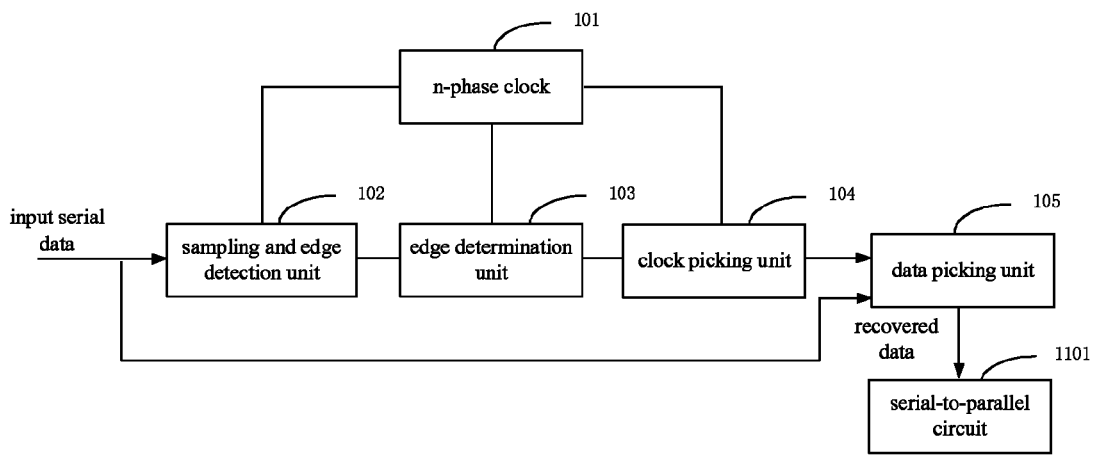
FIG. 11 is a structural diagram illustrating a parallel output circuit in accordance with an embodiment of the present invention.

FIG. 11 illustrates a parallel output circuit in accordance with an embodiment of the present invention. In the embodiment, the parallel circuit includes: a CDR circuit and a serial-to-parallel circuit 1101. The CDR circuit includes: an n-phase clock 101, a sampling and edge detection unit 102, an edge determination unit 103, a clock picking unit 104 and a data picking unit 105.

The n-phase clock 101, the sampling and edge detection unit 102, the edge determination unit 103 and the clock picking unit 104 may have the same structure and functions as those of the sampling and edge detection unit 102 in the first embodiment. Detailed description is thus omitted. Moreover, the CDR circuit in the embodiment may be any of the CDR circuits provided by the embodiments of the present invention.

Input serial data are input to the CDR circuit. The serial-to-parallel circuit 1101 is used to convert recovered data output from the data picking unit 105 of the CDR circuit into parallel data and output. In fact, the data picking unit of the CDR circuit may be a first-stage circuit in the serial-to-parallel circuit.

Preferred embodiments of the present invention are described above. It is noted that, various modifications and alternations can be made by those skilled in the arts without deviation from the principle of the present invention, and the modifications and alternations shall fall within the scope of protection of the present invention.

The invention claimed is:

1. A clock and data recovery (CDR) circuit, comprising: an n-phase clock, a sampling and edge detection unit, an edge determination unit, a clock picking unit and a data picking unit, wherein, a rate ratio of input serial data to any of clock signals provided by the n-phase clock is m; n/m is a natural number greater than 2, m is a natural number greater than zero;

the sampling and edge detection unit comprises: a first sampling group, an edge detection group and a second sampling group; the first sampling group comprises n samplers, and the n samplers in the first sampling group sample the input serial data using n clocks provided by the n-phase clock respectively, wherein a clock used by an i-th sampler in the first sampling group is an i-th clock provided by the n-phase clock where 0≤i<n; the edge detection group comprises n edge detectors, and the n edge detectors are adapted to detect an edge between adjacent sampling points sampled by the first sampling group, wherein a j-th edge detector in the edge detection group is adapted to detect an edge between adjacent sampling points sampled by j-th and (j+1)-th samplers in the first sampling group where 0≤j<n−1, and wherein an (n−1)-th edge detector in the edge detection group is adapted to detect an edge between adjacent sampling points sampled by (n−1)-th and 0-th samplers in the first sampling group; the second sampling group comprises n samplers, and the n samplers in the second sampling group are adapted to sample edge information detected by the n edge detectors respectively, wherein an i-th sampler in the second sampling group is adapted to sample edge information detected by an i-th edge detector where 0≤i<n;

the edge determination unit comprises n/m counting units, wherein a k-th counting unit is adapted to count a sum of sampled edge information from m samplers in the second sampling group whose numbers can be marked as k+n/m×t where t is a natural number ranging from 0 to m−1; when a counting value of an s-th counting unit of the n/m counting units reaches a predetermined modulus, the s-th counting unit disables or resets all other counting units of the n/m counting units, and outputs a valid signal to the clock picking unit, where 0≤k<n/m, 0≤s<n/m;

sampling clocks for the first sampling group, sampling clocks for the second sampling group and counting clocks for each of the counting units are provided by the n-phase clock;

the clock picking unit is adapted to select, upon receiving the valid signal output from the s-th counting unit, m clocks from the n clocks provided by the n-phase clock, each of which has a largest phase difference with one of m corresponding clock groups, and to determine a logical sum of the m clocks having the largest phase differences to be a recovered clock, wherein a t-th corresponding clock group of the m corresponding clock groups comprises two clocks, numbered (s+n/m×t) and (s+n/m×t+1);

the data picking unit is adapted to sample the input serial data using the recovered clock obtained by the clock picking unit, sampled data being recovered data of the CDR circuit.

2. The circuit according to claim 1, wherein, selecting a clock having the largest phase difference with q-th and (q+1)-th clocks from the n clocks provided the n-phase clock comprises:

when n/m is odd, selecting a clock whose number is the remainder of [q+(n/m+1)/2]/n;

when n/m is even, selecting a clock whose number is the remainder of [q+(n/m)/2]/n or the sum of the remainder plus 1.

3. The circuit according to claim 1, wherein, an i-th sampler in the second sampling group is adapted to sample the edge information detected by an i-th edge detector; the clock used by the i-th sampler in the second sampling group is an i1-th clock provided by the n-phase clock, and the phase difference between the i1-th and i-th clocks is determined by the sum of sampling time of an i-th sampler in the first sampling group and time delay of an i-th edge detector, where 0≥i1<n.

4. The circuit according to claim 1, wherein, a k-th counting unit uses m clocks provided by the n-phase clock whose numbers can be marked as k+n/m×t, or m clocks provided by the n-phase clock whose numbers can be marked as k+n/m×t+1.

5. The circuit according to claim 1, wherein, the s-th counting unit is further adapted to protect itself from being reset or disabled while disabling or resetting all the other counting units of the n/m counting units.

6. The circuit according to claim 1, wherein, resetting terminals of the counting units are active-low, and the edge determination unit further comprises n/m AND gates, wherein each of the counting units corresponds to one of the AND gates; each of the counting units is connected to input terminals of all the AND gates except for the one corresponding to the counting unit itself; and an output terminal of each of the AND gates is connected to a resetting terminal of the corresponding counting unit;

when a counting value of an s-th counting unit of the n/m counting units reaches a predetermined modulus, the s-th counting unit outputs a low-level resetting signal to the input terminals of all the AND gates except for the one corresponding to the s-th counting unit.

7. The circuit according to claim 6, wherein, the edge determination unit further comprises n/m OR gates, wherein each of the OR gates corresponds to one of the AND gates; an output terminal of each of the AND gates is connected to a resetting terminal of a counting unit corresponding to the AND gate via a OR gate corresponding to the AND gate;

when a counting value of an s-th counting unit of the n/m counting units reaches a predetermined modulus, the s-th counting unit outputs a high-level protecting signal to an input terminal of the OR gate corresponding to the AND gate that corresponds to the s-th counting unit.

8. The circuit according to claim 1, wherein, the clock picking unit comprises n AND gates and one OR gate, wherein input terminals of the n AND gates are connected to the n clocks provided by the n-phase clock in a one-to-one manner, and a u-th AND gate of the n AND gates is connected to a u-th clock where 0≤u<n;

the u-th AND gate of the n AND gates is connected to a counting unit whose number is the remainder of u/(n/m); output terminals of the n AND gates are connected to input terminals of the OR gate; and a clock output through an output terminal of the OR gate is the recovered clock.

9. The circuit according to claim 8, wherein the clock picking unit further comprises two inverters, wherein the two inverters are connected in series with the output terminal of the OR gate.

10. The circuit according to claim 1, wherein, m=1, the edge determination unit comprises n counting units, wherein a k-th counting unit is adapted to count the sampled edge information from a k-th sampler in the second sampling group, using a k-th or (k+1)-th clock provided by the n-phase clock; when a counting value of an s-th counting unit of the n counting units reaches a predetermined modulus, the s-th counting unit disables or resets all the other counting units of the n counting units, and outputs a valid signal to the clock picking unit, where 0≤k<n, 0≤s<n;

the clock picking unit is adapted to, upon receiving a valid signal output from the s-th counting unit, determine a clock of the n clocks provided by the n-phase clock that has the largest phase difference with s-th and (s+1)-th clocks to be the recovered clock.

11. The circuit according to claim 1, wherein, the edge detector is an XOR gate or an XNOR gate.

12. The circuit according to claim 1, wherein, the counting unit is a counter or a shifter.

13. The circuit according to claim 1, wherein, the circuit further comprises a path matching unit, wherein input data of the path matching unit are the serial input data; time delay of the path matching unit is the same as the clock picking unit;

the data picking unit sampling the input serial data using the recovery clock obtained by the clock picking unit comprises: the data picking unit sampling output data from the path matching unit using the recovery clock obtained by the clock picking unit.

14. The circuit according to claim 1, wherein, the circuit further comprises a buffer, wherein input data of the buffer are sampled data from the first sampling group; the buffer is adapted to delay or filter the input data of the buffer;

the data picking unit is further adapted to synchronize data output from the buffer with the recovered clock obtained by the clock picking unit;

the data picking unit sampling the input serial data using the recovery clock obtained by the clock picking unit comprises: the data picking unit sampling the synchronized data using the recovered clock obtained by the clock picking unit.

15. A parallel output circuit, comprising: a clock and data recovery circuit according to claim 1 and a serial-to-parallel circuit, wherein input serial data are input to the clock and data recovery circuit, and the serial-to-parallel circuit is adapted to convert recovered data output from the data picking unit of the clock and data recovery circuit into parallel data and output the converted data.

16. A parallel output circuit, comprising: a clock and data recovery circuit according to claim 2 and a serial-to-parallel circuit, wherein input serial data are input to the clock and data recovery circuit, and the serial-to-parallel circuit is adapted to convert recovered data output from the data picking unit of the clock and data recovery circuit into parallel data and output the converted data.

17. A parallel output circuit, comprising: a clock and data recovery circuit according to claim 3 and a serial-to-parallel circuit, wherein input serial data are input to the clock and data recovery circuit, and the serial-to-parallel circuit is adapted to convert recovered data output from the data picking unit of the clock and data recovery circuit into parallel data and output the converted data.

18. A parallel output circuit, comprising: a clock and data recovery circuit according to claim 4 and a serial-to-parallel circuit, wherein input serial data are input to the clock and data recovery circuit, and the serial-to-parallel circuit is adapted to convert recovered data output from the data picking unit of the clock and data recovery circuit into parallel data and output the converted data.

19. A parallel output circuit, comprising: a clock and data recovery circuit according to claim 5 and a serial-to-parallel circuit, wherein input serial data are input to the clock and data recovery circuit, and the serial-to-parallel circuit is adapted to convert recovered data output from the data picking unit of the clock and data recovery circuit into parallel data and output the converted data.

20. A parallel output circuit, comprising: a clock and data recovery circuit according to claim 6 and a serial-to-parallel circuit, wherein input serial data are input to the clock and data recovery circuit, and the serial-to-parallel circuit is adapted to convert recovered data output from the data picking unit of the clock and data recovery circuit into parallel data and output the converted data.

* * * * *